United States Patent
Weis et al.

(10) Patent No.: US 9,507,357 B2
(45) Date of Patent: Nov. 29, 2016

(54) CURRENT LIMIT CONTROL WITH CONSTANT ACCURACY

(71) Applicant: Dialog Semiconductor GmbH, Kirchheim/Teck-Nabern (DE)

(72) Inventors: Marcus Weis, Munich (DE); Stephan Drebinger, Munich (DE); Fabio Rigoni, Munich (DE)

(73) Assignee: Dialog Semiconductor GmbH, Kirchheim/Teck-Nabern (DE)

( * ) Notice: Subject to any disclaimer, the term of this patent is extended or adjusted under 35 U.S.C. 154(b) by 422 days.

(21) Appl. No.: 14/277,276

(22) Filed: May 14, 2014

(65) Prior Publication Data
US 2015/0137774 A1  May 21, 2015

(30) Foreign Application Priority Data
Nov. 19, 2013 (EP) .................................. 13193560

(51) Int. Cl.
G05F 1/607 (2006.01)
G05F 1/46 (2006.01)
G05F 1/573 (2006.01)
H02M 1/00 (2006.01)

(52) U.S. Cl.
CPC ................ G05F 1/46 (2013.01); G05F 1/573 (2013.01); *H02M 2001/0009* (2013.01)

(58) Field of Classification Search
CPC .. H02M 3/07; H02M 3/156; H02M 3/33507; H02M 3/33515; H02M 3/1588; H02M 3/1584; H02M 3/158; H02M 3/157; G05F 1/56; G05F 1/575; G05F 1/565; G05F 1/573; G05F 1/569; G05F 1/5735
USPC ........................................ 323/265, 282–286
See application file for complete search history.

(56) References Cited

U.S. PATENT DOCUMENTS

| | | | |
|---|---|---|---|
| 5,892,389 A * | 4/1999 | Lai ....................... | H01H 47/325 323/277 |
| 8,018,213 B2 | 9/2011 | Arndt | |
| 9,024,678 B2 * | 5/2015 | Vacca Cavalotto .......... | G01R 19/0092 323/314 |
| 2007/0229001 A1* | 10/2007 | McIntosh .............. | H02M 3/156 315/307 |
| 2009/0039842 A1* | 2/2009 | Chen ................... | H02M 3/1584 323/272 |
| 2011/0221421 A1 | 9/2011 | Williams | |
| 2012/0119677 A1* | 5/2012 | Serdarevic ......... | H05B 33/0812 315/307 |

FOREIGN PATENT DOCUMENTS

DE  19812920  12/1999

OTHER PUBLICATIONS

European Search Report 13193560.3-1809 Mailed: Apr. 24, 2014, Dialog Semiconductor GmbH.

* cited by examiner

*Primary Examiner* — Gary L Laxton
*Assistant Examiner* — Kevin H Sprenger
(74) *Attorney, Agent, or Firm* — Saile Ackerman LLC; Stephen B. Ackerma (57) ABSTRACT

The present document relates to a current sensing and/or control circuit with reduced sensing errors. A current control circuit for controlling a load current into an electronic device is described. The current control circuit comprises an array of control transistors configured to adjust the load current provided at an output of the array of control transistors. The load current is drawn from a power supply at an input voltage. Furthermore, the power supply is coupled to an input of the array of control transistors. The circuit further comprises a reference transistor coupled to the power supply at an input of the reference transistor and a reference current source configured to draw a reference current at an output of the reference transistor.

25 Claims, 5 Drawing Sheets

FIG. 5

CURRENT LIMIT CONTROL WITH CONSTANT ACCURACY

TECHNICAL FIELD

The present document relates to current conveyers. In particular, the present document relates to a current sensing and/or control circuit with reduced sensing errors.

BACKGROUND

In switch-mode power converters (SMPC), current-mode pulse width-modulation (PWM) control and current-limited pulse-frequency-modulation (PFM) control schemes are widely used due to their fast dynamic response. Both control schemes make use of a monitoring of the input current into the power converter to modify the pulse width in PWM or oscillation frequency in PFM for voltage regulation.

Furthermore, regardless of the type of feedback control, DC-DC converters and linear regulators typically sense the input current for overcurrent (overload) protection. Additionally, the sensed current may be used in current-mode control DC-DC converters for loop control.

The present document addresses the technical problem of providing an accurate indication of the input current into an electronic device (such as a power converter or a linear regulator). A current sensing circuit and an associated method are described, which allow for the determination of the input current with a reduced error. In particular, the described circuit and method allow for an accurate measurement of the input current, wherein a dependence of the measurement accuracy on the level of the input current may be reduced and possibly completely removed.

SUMMARY

According to an aspect, a current control circuit for controlling a load current into an electronic device is described. The electronic device may e.g. be a DC (direct current)-to-DC power converter or a linear regulator. The load current is also referred to herein as the input current. The current control circuit may be configured to set a target level for the load current. Furthermore, the current control circuit may be configured to provide an indication of whether the actual level of the load current is higher than or lower than the target level. The indication may be passed to a device control unit which may be configured to control the electronic device based on the indication. In particular, the electronic device may be controlled such that a deviation of the actual level of the load current and the target level is reduced. As such, the current control circuit may also be referred to as a current limit control circuit, as it may be configured to limit the load current to the target level.

The current control circuit may comprise an array of control transistors (also referred to as sensing elements) configured to adjust the load current which is provided at an output of the array of control transistors. The array of control transistors typically comprises a plurality of control transistors. The plurality of control transistors may be arranged in parallel with respect to each other. The control transistors may comprise or may be metal oxide semiconductor (MOS) transistors, e.g. N type MOS transistors. The output of the array of control transistors may correspond to the (coupled) sources of the control transistors.

The load current may be drawn from a (DC) power supply at an input voltage. The power supply may be coupled to an input of the array of control transistors. The input of the array of control transistors may correspond to the (coupled) drains of the control transistors.

Furthermore, the current control circuit may comprise a reference transistor which is coupled to the power supply at an input of the reference transistor. The reference transistor may comprise or may be a MOS transistor, e.g. an N-type MOS transistor. In particular, the reference transistor may be of the same type as the control transistors. The reference transistor and the array of control transistors may form two parallel branches which are coupled at their input (e.g. drains) to the power supply at the input voltage.

In addition, the current control circuit may comprise a reference current source which is configured to draw a reference current at an output of the reference transistor. As such, the reference transistor may be traversed by the reference current. In other words, the drain-source current of the reference transistor may correspond to the reference current. In a similar manner, the drain-source current of the array of control transistors may correspond to the load current.

In addition, the current control circuit may comprise a controller configured to select one or more control transistors from the array of control transistors. The one or more selected control transistors may be activated (i.e. at least partially closed). On the other hand, the zero, one or more control transistors from the array of control transistors, which have not been selected, may remain deactivated (i.e. open).

Furthermore, the current control circuit comprises transistor control units which are configured to control the reference transistor to provide a reference on-resistance and configured to control the selected one or more control transistors to provide an array on-resistance. In other words, the transistor control units may be configured to activate the reference transistor and the one or more selected control transistors. As a result of the activation, the transistors typically behave as resistors having the reference on-resistance (for the reference transistor) and a combined array on-resistance (for the combination of the selected one or more control transistors). For this purpose, the reference transistor and the selected one or more control transistors may be operated in their linear regions. The transistor control units may be coupled with one another. In other words, the transistor control units may be operated in synchronicity.

The controller may be configured to select the one or more control transistors such that a ratio of a target level of the load current and the reference current corresponds to a ratio of the reference on-resistance and the array on-resistance. In other words, the controller may be aware of the individual on-resistances of the control transistors. Furthermore, the controller may be aware of the arrangement of the control transistors within the array of control transistors. In addition, the controller may be aware of the reference on-resistance. The controller may use this knowledge to identify one or more control transistors from the array of control transistors, such that the individual on-resistances of the selected one or more control transistors provide an overall array on-resistance, and such that the ratio of the reference on-resistance and the array on-resistance corresponds to a pre-determined ratio (also referred to as the ratio n:1 in the present document). This pre-determined ratio typically corresponds to the ratio of the target level of the load current and the reference current.

The control transistors from the array of control transistors typically exhibit control transistor dimensions (comprising e.g. length/widths ratios). In a similar manner, the reference transistor typically exhibits reference transistor dimensions (comprising e.g. length/widths ratios). The controller may be configured to select the one or more control transistors such that the ratio of the target level of the load current and the reference current corresponds to a ratio of the reference transistor dimensions and effective dimensions of the selected one or more control transistors. The effective dimensions are dependent on the control transistor dimensions of the selected one or more control transistors. Furthermore, the effective dimensions are typically dependent on the arrangement of the selected one or more control transistors. In other words, the controller may be configured to select the one or more control transistors, in order to create an effective control transistor (comprising the selected one or more control transistors) having effective dimensions, such that the ratio of the reference transistor dimensions and the effective dimensions corresponds to the pre-determined ratio (e.g. n:1).

The control transistors of the array of control transistors may have substantially equal on-resistances. The controller may be configured to select more or less control transistors to decrease or increase, respectively, the array on-resistance. In particular, the plurality of control transistors of the array of control transistors may be arranged in parallel with respect to one another. The controller may select more or less of the control transistors, in order to decrease or increase the array on-resistance. The on-resistance of a control transistor may be $R_c$ and the array on-resistance may be $R_c/q$, wherein q is the number of selected (parallel) control transistors.

The control transistors of the array of control transistors may have (at least partially) different on-resistances. The controller may be configured to select different combinations of control transistors to adjust the array on-resistance. In particular, the array of control transistors may comprise an ordered sequence of r control transistors. The on-resistances of adjacent control transistors from the ordered sequence of control transistors may differ by a factor ½ starting from a maximum on-resistance $R_0$. As such, the ordered sequence of control transistors may comprise binary weighted control transistors. The controller may be configured to select one or more control transistors to provide array on-resistances in the range of the maximum on-resistance $R_0$ times a factor from the interval$[1, 1/(2^r-1)]$. Typically, factors from the above mentioned interval are separated by a step size of $½^r$. By doing this, $2^r$ different ratios between the target level of the load current and the reference current may be provided, while using only r control transistors. In other words, $2^r$ different target levels may be set using only r control transistors.

The reference on-resistance may correspond to the maximum on-resistance $R_0$. Hence, the pre-determined ratios n may vary between 1 and $(2^{(r-1)}-1)$ with a step size of 1. Hence, this allows for an almost continuous setting of the target level of the load current. Furthermore, this allows the relative accuracy of the actual level of the load current to be independent of the target level of the load current.

The current control circuit may further comprise a comparator unit (e.g. an amplifier) configured to compare a reference voltage at the output of the reference transistor with a load voltage at the output of the array of control transistors, to yield a comparison signal. Typically, the reference voltage is indicative of the reference current. In particular, the reference voltage typically depends on the product of the reference on-resistance and the reference current. In a similar manner, the load voltage (also referred to as a source voltage in the present document) is indicative of the actual level of the load current. In particular, the load voltage typically depends on the product of the actual level of the load current and the array on-resistance. The comparison signal may be indicative of the actual level of the load current relative to the reference current. In particular, the comparison signal may be indicative of whether the actual level of the load current is greater or smaller than the reference current times the pre-determined ratio n. As outlined above, the electronic device may be controlled in dependence of the comparison signal.

The controller may be configured to select different combinations of one or more control transistors to set different target levels of the load current. By way of example, the reference current may be fixed, and modifications in the target level of the load current may be achieved by modifying the selection of activated one or more control transistors.

The controller may be configured to select the one or more control transistors such that a relative deviation of the actual level of the load current from the target level remains at or below a pre-determined threshold (e.g. 10% or less). The relative deviation may be measured in relation to the target level of the load current.

As already indicated above, the transistor control units may be configured to maintain open the one or more control transistors from the array of control transistors, which have not been selected. As a result of this, the array on-resistance is typically only dependent on the selected one or more control transistors.

As such, it is proposed in the present document to adapt the resistance of a pass device (also referred to as the one or more control transistors) using n transistor elements (i.e. using an array of control transistors). The resistance may be adapted as a function of the load current. This may yield a flat or quasi-flat accuracy, even in the presence of an offset for the loop which controls the load current.

According to a further aspect, a method for controlling a load current into an electronic device is described. The method comprises the step of adjusting the load current provided at an output of an array of control transistors, by closing selected ones of the control transistors from the array of control transistors. The load current may be drawn from a power supply at an input voltage, wherein the power supply is coupled to an input of the array of control transistors. The method may further comprise providing a reference transistor which is also coupled to the power supply at an input of the reference transistor, and drawing a reference current at an output of the reference transistor (e.g. using a current source). In addition, the method may comprise selecting one or more control transistors from the array of control transistors. The reference transistor may be controlled to provide a reference on-resistance and the selected one or more control transistors may be controlled to provide an array on-resistance. The one or more control transistors may be selected such that a ratio of a target level of the load current and the reference current corresponds to a ratio of the reference on-resistance and the array on-resistance.

In summary, a method for controlling a load current into an electronic device, the method comprising adjusting the load current provided at an output of an array of control transistors wherein the load current is drawn from a power supply at an input voltage wherein the power supply is coupled to an input of the array of control transistors, providing a reference transistor coupled to the power supply at an input of the reference transistor, drawing a reference current at an output of the reference transistor, selecting one or more control transistors from the array of control transistors, and controlling the reference transistor to provide a reference on-resistance and controlling the selected one or more control transistors to provide an array on-resistance; wherein the one or more control transistors are selected such that a ratio of a target level of the load current and the reference current corresponds to a ratio of the reference on-resistance and the array on-resistance.

According to a further aspect, a software program is described. The software program may be adapted for execution on a processor and for performing the method steps outlined in the present document when carried out on the processor.

According to another aspect, a storage medium is described. The storage medium may comprise a software program adapted for execution on a processor and for performing the method steps outlined in the present document when carried out on the processor.

According to a further aspect, a computer program product is described. The computer program may comprise executable instructions for performing the method steps outlined in the present document when executed on a computer.

It should be noted that the methods and systems including its preferred embodiments as outlined in the present document may be used stand-alone or in combination with the other methods and systems disclosed in this document. In addition, the features outlined in the context of a system are also applicable to a corresponding method. Furthermore, all aspects of the methods and systems outlined in the present document may be arbitrarily combined. In particular, the features of the claims may be combined with one another in an arbitrary manner.

In the present document, the term "couple" or "coupled" refers to elements being in electrical communication with each other, whether directly connected e.g., via wires, or in some other manner.

BRIEF DESCRIPTION OF THE DRAWINGS

The invention is explained below in an exemplary manner with reference to the accompanying drawings, wherein.

DESCRIPTION

Figure 1:
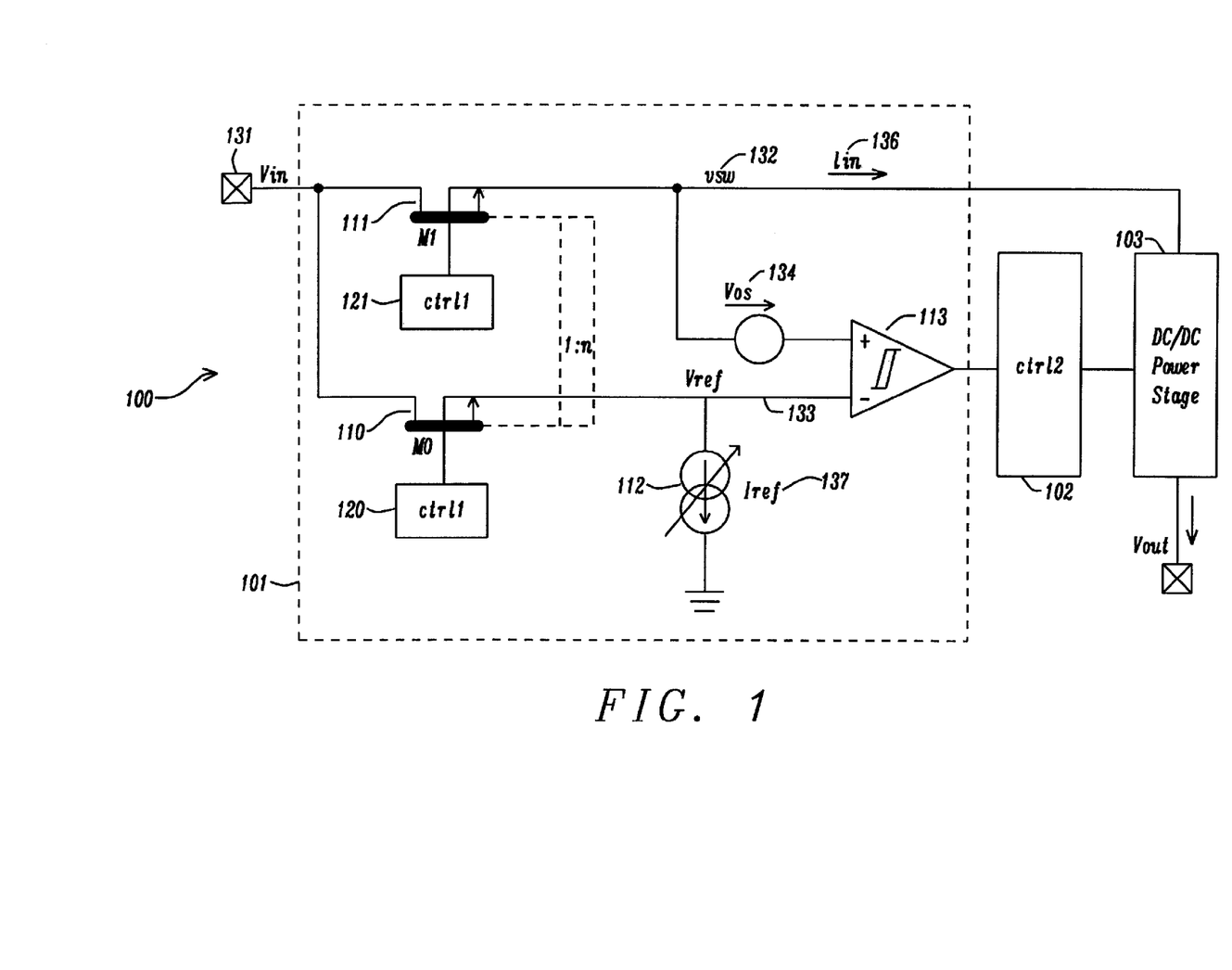
FIG. 1 illustrates a block diagram of an example current control circuit.

FIG. 1 shows a block diagram of an example circuit 100 comprising an electronic device 103 (e.g. a DC/DC power converter) which draws an input current Iin 136. Furthermore, the example circuit 100 comprises a current control circuit 101 which is configured to control the electronic device 103 (via the control stage 102), such that the electronic device 103 draws a pre-determined input current Iin 136 (e.g. a fixed input current). The current control circuit 101 comprises a control transistor M1 111 (also referred to as a sensing device) configured to provide a drain-source current flowing through the control transistor M1 111, subject to a gate control signal generated by the gate control unit 121 and applied to the gate of the control transistor M1 111. Hence, the control transistor M1 111 may be configured to adjust the input current Iin 136, subject to the gate control signal. For this purpose, the control transistor M1 111 may be operated in its linear mode, where the control transistor M1 111 may be viewed as a resistor with a resistance (or on-resistance) which is controlled by the gate control signal. In the illustrated example, the drain of the control transistor 111 is coupled to the input voltage Vin 131.

Furthermore, the current control circuit 101 comprises a reference transistor M0 110 which is controlled via its gate using the gate control unit 120. In the illustrated example, the drain of the reference transistor M0 110 is coupled to the input voltage Vin 131. As such, the drains of the reference transistor 110 and the control transistor 111 are coupled with each other. Hence, the control transistor 111 and the reference transistor 110 form parallel branches. The gate control unit 120 of the reference transistor 110 and the gate control unit 121 of the control transistor 111 are typically operated in synchronicity or are the same. The control transistor 111 and/or the reference transistor 110 may be metal oxide semiconductor (MOS) transistor, e.g. MOS field effect transistors (FET). In the illustrated example, the control transistor 111 and the reference transistor 110 are n-type MOS transistors.

Typically, the control transistor M1 111 has no influence to adjust the input current Iin 136. The transistor M1 111 may be a device where current flows through (because it is drawn by the electronic device 103). The transistor M0 110 may be operated in the same operating condition as the transistor M1 111. The transistor M0 111 is typically smaller than the control transistor M1 111 by a pre-determined factor n, so that the input current Iin 136 can be compared to a reference current Iref 137 which is n times smaller than the input current Iin 136. Typically, the information of the voltages vsw 132 and vref 133 empowers the control unit ctrl2 102 to adjust the electronic device 103 and to thereby control the current Iin 136.

The gate control unit 120 may be on, whenever the input current limit circuit 100 is active. In the illustrated example, the potential of ctrl1 (i.e. the potential of the gate control units 120, 121) may be at 5V above the input voltage Vin 131, since in the illustrated example NMOS 5V devices are used. A charge pump may be used to generate the increased gate voltage. As such, the gate control units 120, 121 may be configured to generate gate control signals for turning on the respective transistors 111, 110.

The voltage level at the source of the control transistor 111 may be referred to as the source voltage vsw 132 and the voltage level at the source of the reference transistor 110 may be referred to as the reference voltage vref 133. The current control circuit 101 further comprises a current source 112 (also referred to as the reference current source), which is configured to generate a drain-source current through the reference transistor 110, wherein the drain-source current through the reference transistor 110 corresponds to the reference current Iref 137. Hence, the current source 112 may be used to control the level of the reference voltage vref 133. In particular, the reference voltage vref 133 depends on the voltage from the gate of the reference transistor 110 to the voltage of the source of the reference transistor 110 using the reference current Iref 137 which is set by the current source 112.

The current control circuit 101 further comprises a comparator unit 113 (e.g. an operational amplifier). A first input of the comparator unit 113 (e.g. the positive input) may be coupled to the source of the control transistor 111. In other words, the source voltage vsw 132 may be applied to the first input of the comparator unit 113. Furthermore, a second input of the comparator unit 113 (e.g. the negative input) may be coupled to the source of the reference transistor 110. In other words, the reference voltage vref 133 may be applied to the second input of the comparator unit 113. The comparator unit 113 may be configured to compare the source voltage vsw 132 with the reference voltage 133. In particular, the comparator unit 113 may be configured to provide an indication on whether the source voltage vsw 132 is greater or smaller than the reference voltage vref 133.

The control stage 102 may be configured to control the electronic device 103 based on the indication on whether the source voltage vsw 132 is greater or smaller than the reference voltage vref 133. In particular, the control stage 102 may be configured to control the electronic device 103 such that input current Iin 136 stays at a pre-determined level, wherein the pre-determined level is typically dependent on the reference current Iref 137.

In other words, a sense element like the control transistor M1 111, which lies within the power path from the input voltage Vin 131 over the source voltage vsw 132 to the output voltage Vout of the electronic device 103, probes information regarding the input current Iin 136. In the illustrated example, the information regarding the input current Iin 136 is the voltage drop across the control transistor M1 111 from the input voltage Vin 131 to the source voltage vsw 132. The voltage drop at the control transistor M1 111 (indicated by the source voltage vsw 132) is compared to a reference voltage drop. In the illustrated example, the reference voltage drop is the voltage drop from Vin 131 to the reference voltage vref 133 over the reference transistor M0 110. Hence, the reference voltage drop is indicated by the reference voltage vref 133. The comparison unit 113 (e.g. an amplifier) with its inputs vsw 132 and vref 133 may regulate the control unit ctrl2 102 of the electronic device 103 (e.g. the DC/DC power stage) in a way that the input current Iin 136 and the reference current Iref 137 are equal (up to a proportionality factor).

The reference voltage drop may be created using the reference transistor M0 110 and the reference current source 112 with the reference current Iref 137. The ratio of the input current Iin 136 divided by the reference current Iref 137 is typically the same as the ratio of the control transistor M1 111 and the reference transistor M0 110. The ratio of the control transistor M1 111 and the reference transistor M0 110 may be the ratio of the dimensions of the control transistor M1 111 and the dimensions of the reference transistor M0 110. In particular, the ratio of the control transistor M1 111 and the reference transistor M0 110 may be the width/length ratio of the control transistor M1 111 divided by the width/length ratio of the reference transistor M0 110.

In the illustrated example, the ratio is 1:n, indicating that the control transistor 111 has an n time lower on-resistance than the reference transistor 110, i.e. indicating that the input current Iin 136 is n time higher than the reference current Iref 137. In particular, this is the case in steady state condition, when the system 100 is in regulation minus the error introduced by a finite loop gain which is typically small. The ratio 1:n is typically high, e.g. in the range of 1:hundreds to 1:thousands, for reasons of power efficiency. Hence, a desired current limit with respect to the input current Iin 137 may be set by setting the reference current Iref 137.

The equivalence of the input current Iin 136 to the reference current 137 multiplied by n, can typically only be ensured in case of a precise comparison between the source voltage vsw 132 (which is indicative of the input current Iin 136) and the reference voltage vref 133 (which is indicative of the reference current Iref 137). However, the comparison unit 113 (e.g. the amplifier 113) typically exhibits an unknown offset. Such an offset can be modelled using an offset voltage source generating an offset voltage Vos 134 at one input of the comparison unit 113.

It can be shown that the accuracy of the current limit control circuit 101 typically depends substantially on the offset of the comparison unit 113 (i.e. on the offset voltage Vos 134). For a given ratio 1:n and for a given reference current Iref, the offset-dependent accuracy (in percent) may be given by $$\frac{(Vin - vsw) + Vos}{(Vin - vsw)}$$

where (Vin−vsw)=Iref·n·res_M1, and where res_M1 is the on-resistance of the control transistor M1 111. Hence, the accuracy of the current control is dependent on the current limit (Iref times n) which is set by the reference current Iref 137.

Figure 2:
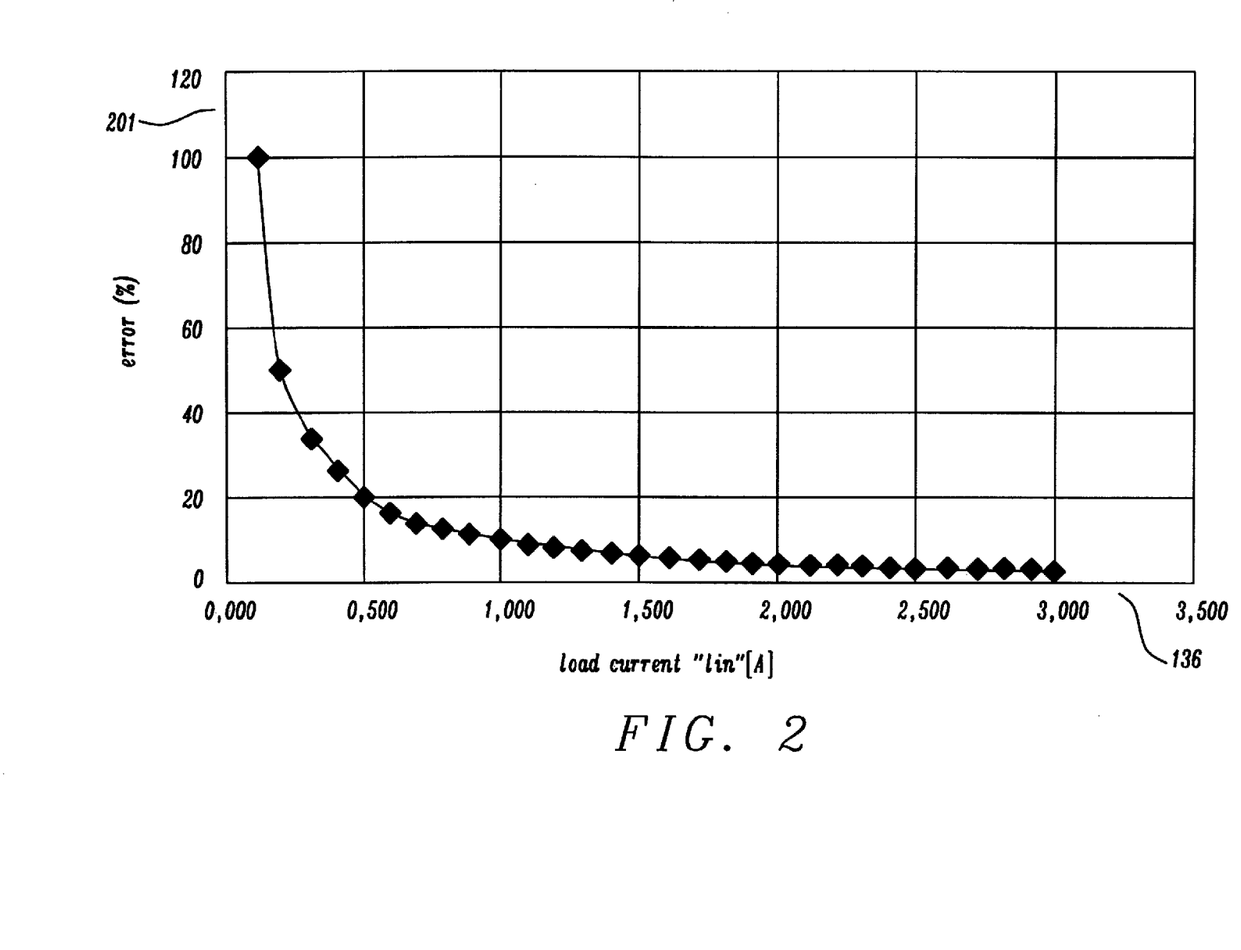
FIG. 2 illustrates an example accuracy of the current control circuit of FIG. 1.

FIG. 2 illustrates the accuracy (i.e. the error 201 over the load current) in percentage for a ratio 1:n=1:1000, for a voltage offset Vos=10 mV, for an input voltage Vin=5V, and for a resistance of the control transistor M1 of 100 mΩ as a function of the load or input current Iin 136 (step size 100 mA). It can be seen that the error 201 is almost 100% for load currents 136 which tend towards zero.

In the following, a method and a current control circuit are described which allow the input current 136 to be limited to a pre-determined level, with a current independent or quasi current independent accuracy. In particular, a fixed or quasi-fixed value of accuracy may be ensured for a current limit, independently from the set current limit.

Figure 3:
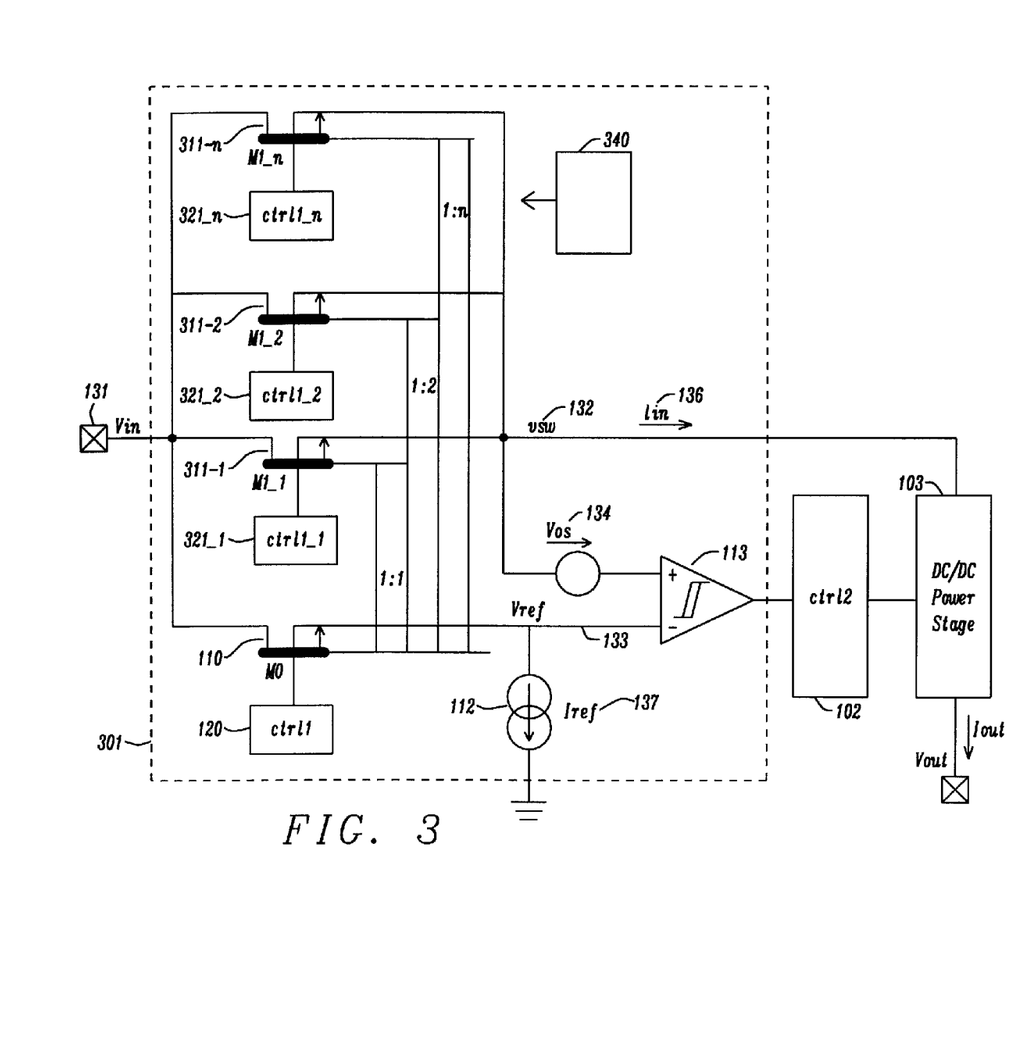
FIG. 3 shows a block diagram of an example current control circuit with increased accuracy.

FIG. 3 shows a block diagram of an example current control circuit 301, which is configured to control the level of the input current 136 with an accuracy which does not depend on the level of the input current 136 or which depends on the level of the input current 136 only to a limited degree. The current control circuit 301 comprises an array of control transistors M1_1, M1_2, . . . , M1_n (reference numerals 311-1, 311-2, . . . , 311-n, respectively). In other words, the single sense element of the control circuit 101 of FIG. 1 may be split into a plurality of sense elements (or control transistors) M1_1, M1_2, . . . , M1_n. The control transistors M1_1, M1_2, . . . , M1_n may be arranged in a parallel manner with respect to each other. The control transistors M1_1, M1_2, . . . , M1_n are controlled using gate control units 321-1, 321-2, . . . , 321-n, respectively. One or more of the gate control units 321-1, 321-2, . . . , 321-n may generate gate control signals for the respective one or more control transistors M1_1, M1_2, . . . , M1_n. The one or more gate control units 321-1, 321-2, . . . , 321-n may be in synchronicity with the gate control unit 120 of the reference transistor M0 110. In particular, the gate control units may be operated in a similar manner to the gate control units of FIG. 1. The control signals ctrl1_1 to _n of FIG. 3 may be set to a voltage above the input voltage Vin 131 to turn on the respective transistor, or the potential may be set to the input voltage Vin 131 to turn the transistor off. The control signals ctrl1_1 to _n may be selected to turn on and/or off the respective transistor, depending on the current limit of the input current Iin 136.

In the illustrated example, the control transistors 311-1, 311-2, . . . , 311-n all have the same size ratios with respect to the reference transistor 110. In particular, the control transistors 311-1, 311-2, . . . , 311-n may all have a size ratio of 1 with respect to the reference transistor 110. As a result of this, an effective control transistor having a size ratio of 2 with respect to the reference transistor 110 may be obtained by activating two of the array of control transistors 311-1, 311-2, . . . , 311-n in parallel. In a similar manner, an effective control transistor having a size ratio of 3 with respect to the reference transistor 110 may be obtained by activating three of the array of control transistors 311-1, 311-2, . . . , 311-n in parallel, etc. Hence, difference ratios between the reference current Iref 137 and the target level of the input current Iin 136 may be obtained by selecting a different number of activated control transistors from the array of control transistors 311-1, 311-2, . . . , 311-n.

In the illustrated example, the number of control transistors 311-1, 311-2, . . . , 311-n corresponds to n. As indicated above, the ratio n may be relatively high e.g. 100 or more, or 1000 or more.

It should be noted that the different control transistors 311-1, 311-2, . . . , 311-n may have different size ratios with respect to the reference transistor 110. By way of example, the first control transistor 311-1 may have a size ratio of 1 with respect to the reference transistor 110, the second control transistor 311-2 may have a size ratio of 2 with respect to the reference transistor 110, and the $n^{th}$ control transistor 311-n may have a size ratio of n with respect to the reference transistor 110. In this case, the different ratios 1 to n between Iref 137 and Iin 136 may be implemented by activating a different one of the array of control transistors 311-1, 311-2, . . . , 311-n.

The current control circuit 301 may comprise a controller 340 which is configured to select one or more control transistors from the array of control transistors 311-1, 311-2, . . . , 311-n, in dependence of the target level of the input current Iin 136. In particular, the controller 340 may select the one or more control transistors 311-1, 311-2, . . . , 311-n, such that the accuracy of the current control stays at or above a pre-determined accuracy level (i.e. at or below a pre-determined error level 201), regardless the target level of the input current Iin 136 (which typically depends on the reference current Iref 137 and/or on the ratio 1:n). In particular, the controller 340 may be configured to control the transistors M1_x 321-1, . . . , 311-n because the input current limit, i.e. the limit of the input current Iin 136 is known.

Hence, the current limit control circuit 301 of FIG. 3 may be configured to ensure a fixed value for the current limit accuracy, independent from the set current limit. It should be noted that even though FIG. 3 shows a DC/DC power converter 103 as an electronic device, the current limit control circuit 301 of FIG. 3 may be used in conjunction with other electronic devices (e.g. in conjunction with linear regulators).

The reference current source 112 of FIG. 3 may be configured to provide a fixed reference current Iref 137, regardless the target level of the input current Iin 136. In particular, even if the input voltage Iin 136 is to be set to different target levels, the reference current Iref 137 may remain unchanged. Instead of a variable reference current Iref 137, the target level of the input current Iin 136 may be set by selecting one or more of the control transistors M1_1, M1_2, . . . M1_n. In other words, alternatively or in addition to modifying the reference current Iref 137 to set the target level, Iref times n, for the input current Iin 136, the current control circuit 301 of FIG. 3 may be configured to set the target level for the input current Iin 136 by modifying the ratio 1:n using the array of control transistors M1_1, M1_2, . . . M1_n.

Hence, the controller 340 may be configured to select one or more of the control transistors M1_1, M1_2, . . . M1_n, in dependence on the target level of the input current 136, which is to be set. In other words, in order to set a current limit (i.e. a target level for the input current 136) the ratio of the reference transistor M0 and of the combination of the activated control transistors M1_1, M1_2, . . . M1_n may be set using the gate control units ctrl1_1, ctrl1_2, . . . ctrl1_n.

Even for the current control circuit 301 of FIG. 3, the accuracy of current setting is typically dependent on the input referred offset Vos 134 of the comparison unit 113 (e.g. the amplifier). However, the accuracy is now given by:

$$\frac{(Vin - vsw) + Vos}{(Vin - vsw)},$$

where $(Vin-vsw)=n \cdot Iref \cdot (res\_M1\_1 \| res\_M1\_2 \| .. \| res\_M1\_n)$ and where $(res\_M1\_1 \| res\_M1\_2 \| .. \| res\_M1\_n)$ is the on-resistance of the parallel arrangement of one or more control transistors M1_1, M1_2, . . . M1_n.

Since Iref and the resistances of the control transistors M1_1 to M1_n are constant values, the accuracy is only dependent on the offset voltage Vos 134 and is independent of the input current Iin 136. In particular, the number and size of the activated control transistors may be selected such that for different ratios 1:n (i.e. for different target levels for the input current Iin 136), the product of the on-resistance of the activated control transistors, i.e. $(res\_M1\_1 \| res\_M1\_2 \| .. \| res\_M1\_n)$, and the ratio 1:n is constant.

As outlined above, the current limit setting is now dependent on the number and the size of the (activated) control transistors M1_1 to M1_n. For an input current range from 100 mA to 3 A in 100 mA steps n=30 control transistors M1_1 to M1_n may be used for the current sensing. For the case that all the resistances of the control transistors M1_1 to M1_n are the same (e.g. 35Ω), the accuracy error 201 is a fixed value of 3.3%, which is independent of the level of the input current Iin 136.

Hence, in an example, the array of control transistors comprises n (substantially) equal transistors which are arranged in parallel. The controller 340 may be configured to select one or more of the control transistors, wherein the number of selected control transistors depends on the target level of the input current Iin 136. In other words, the controller 340 may translate the target level of the input current Iin into a number of control transistors, which are to be controlled via their respective gate control units (in synchronicity with the gate control unit 120 of the reference transistor 110). The other control transistors may remain deactivated (i.e. open) and by consequence to not have an impact on the effective on-resistance of the array of control transistors.

It should be noted that in addition or alternatively to using a number of control transistors having a substantially equal on-resistance, control transistors with different on-resistances may be used. By way of example, the on-resistances may be binary weighted. By way of example, control transistors with the following on-resistances could be used: M1_1=3Ω, M1_2=1.5Ω, M1_3=0.75Ω, M1_4=0.375Ω, M1_5=0.1875Ω. This could be used to achieve the same accuracy as when using 30 equally sized control transistors, while at the same time using only a reduced number of control transistors. The controller 340 may then be configured to select appropriate groups of control transistors, in order to create the on-resistance which corresponds to the target level of the input current Iin 136.

In more general terms, different ratios between 1:1 and 1:n may be achieved by using r=round($\log_2$ (n)) (rounded to the next highest integer) control transistors having on-resistances $R_0, R_0/2, R_0/2^2, \ldots, R_0/2^{r-1}$, respectively. $R_0$ may correspond to the on-resistance of the reference transistor M0 110. By doing this, the different on-resistance ratios between the effective on-resistance (of the activated control transistors) and the reference on-resistance (of the reference transistor) may be modified from $R_0:R_0$ (i.e. 1:1) to $R_0/(2^r-1):R_0$ (i.e. $1:(2^r-1)$) in steps of $\frac{1}{2}^r$, by selecting appropriate combinations of control transistors from the array of control transistors.

Furthermore, overlapping sub-binary weighted control transistors may be used, such as M1_1=3Ω, M1_2=1.6Ω, M1_3=0.853Ω, M1_4=0.455Ω, M1_5=0.243Ω, in order to account for a possible mismatch between the control transistors. In other words, instead of using control transistors having on-resistances $R_0, R_0/2, R_0/2^2, \ldots, R_0/2^{r-1}$, respectively, the difference between the on-resistances of the control transistors may be reduced (e.g. $R_0$, $R_0/(2-\epsilon), R_0/(2-\epsilon)^2, \ldots, R_0/(2-\epsilon)^{r-1}$, with $\epsilon$ being a real number greater than 0 and smaller than 1). By doing this, the ratio between the effective on-resistance of the array of control transistors and the on-resistance of the reference transistor may be adjusted in a quasi continuous manner, even in case of possible mismatches between at least one or more of the control transistors.

Alternatively or in addition, increased limits for the accuracy may be defined. The array of control transistors may then be designed such that, regardless the target level for the input current Iin 136, the control accuracy 201 does not exceed the defined limit. In such cases, the accuracy 201 may vary within a range of zero and the defined accuracy limit. For example, a ratio $n_1=100$ may be used for load currents 0.1 A to 0.3 A, a ratio $n_2=400$ may be used for load currents 0.4 A to 1.2 A, and a ratio $n_3=1000$ may be used for load currents 1.3 A to 3 A. This yields a maximum error (i.e. an accuracy limit) of 10%, while making use of only three control transistors.

In other words, the array of control transistors may comprise a pre-determined number of control transistors configured to provide L different ratios $n_1, \ldots, n_L$ (in conjunction with the reference transistor M0). The different ratios may be used to provide different target levels of the input current Iin 136 in the range of $I_{min}$, up to $I_{max}$. The different ratios $n_1, \ldots, n_L$ may be selected such that Iin/n does not exceed a pre-determined threshold for any of $I_{min}$ up to $I_{max}$. The pre-determined threshold corresponds to the pre-determined accuracy limit, and typically depends on the offset voltage Vos 134.

It should be noted that the array of control transistors 311-1, ..., 311-n differs from so called split pass devices, which may be used for achieving an improved efficiency of DC-to-DC converters. In the present document, it is proposed to make use of an array of control transistors 311-1, ..., 311-n to control and increase the accuracy of the measurement of the input current Iin 136.

Figure 4:
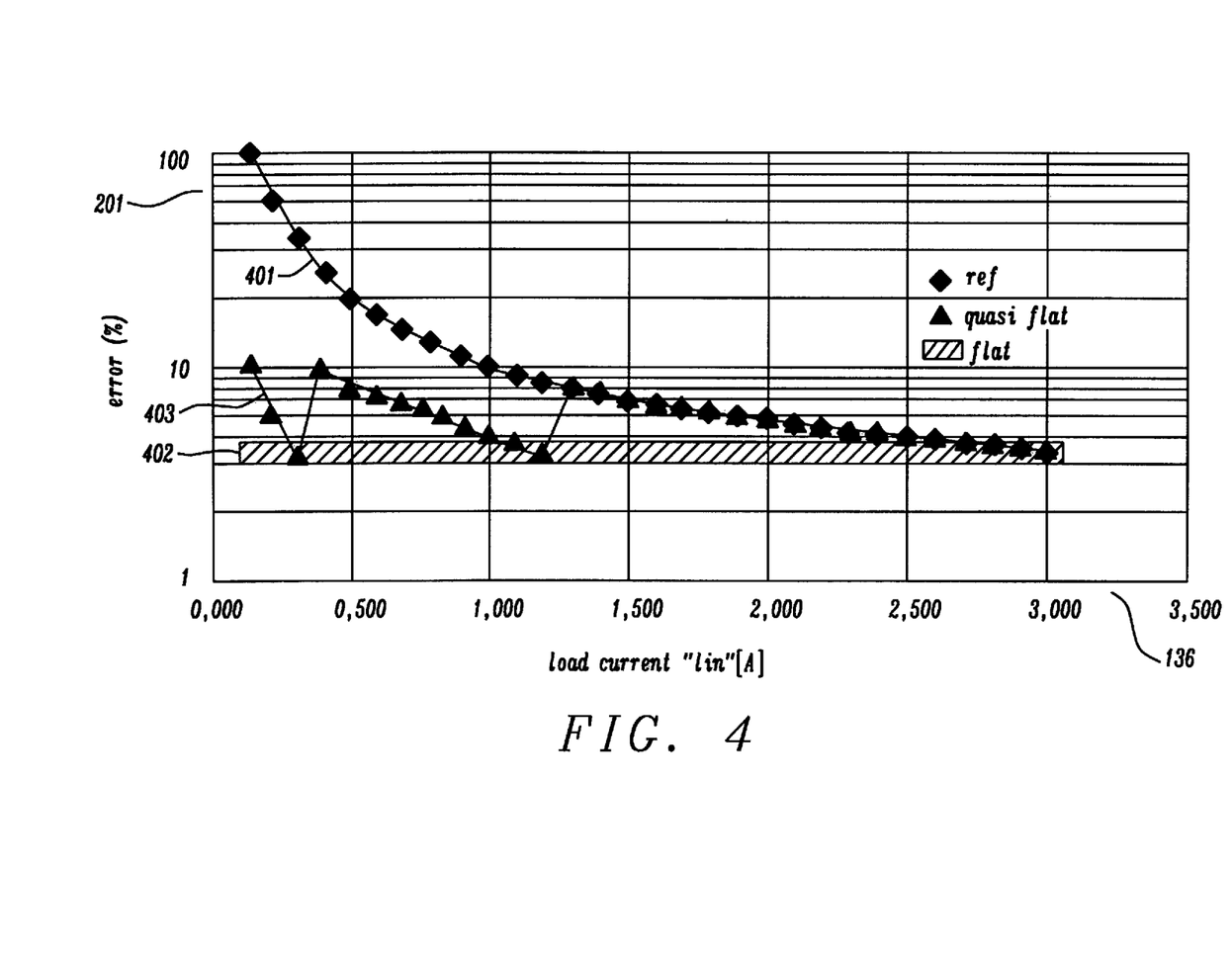
FIG. 4 illustrates example accuracies, which may be achieved when using the current control circuit of FIG. 3.

FIG. 4 illustrates the dependency of the control error 201 on the level of the input current 136 for different arrangements of control transistors. Curve 401 corresponds to the case of FIG. 1. Curve 402 (the flat case) corresponds to the case of an array of control transistors which allows the overall on-resistance of the array of control transistors to be reduced by a divisor which corresponds to the factor of an increase of the target level for the input current 136 (for each incremental step of the target level). Curve 403 (the quasi flat case) corresponds to the case of an array of control transistors which allows the overall on-resistance of the array of control transistors to be reduced by a divisor which corresponds to the factor of an increase of the target level for the input current 136 (however, only for a subset of incremental steps of the target level).

Hence, it can be seen that by using an array of control transistors, which allows the effective on-resistance to be adjusted, a current limit control with an increased accuracy can be provided. In particular, a dependency of the relative accuracy of the current limit control on the level of the input current can be reduced.

Figure 5:
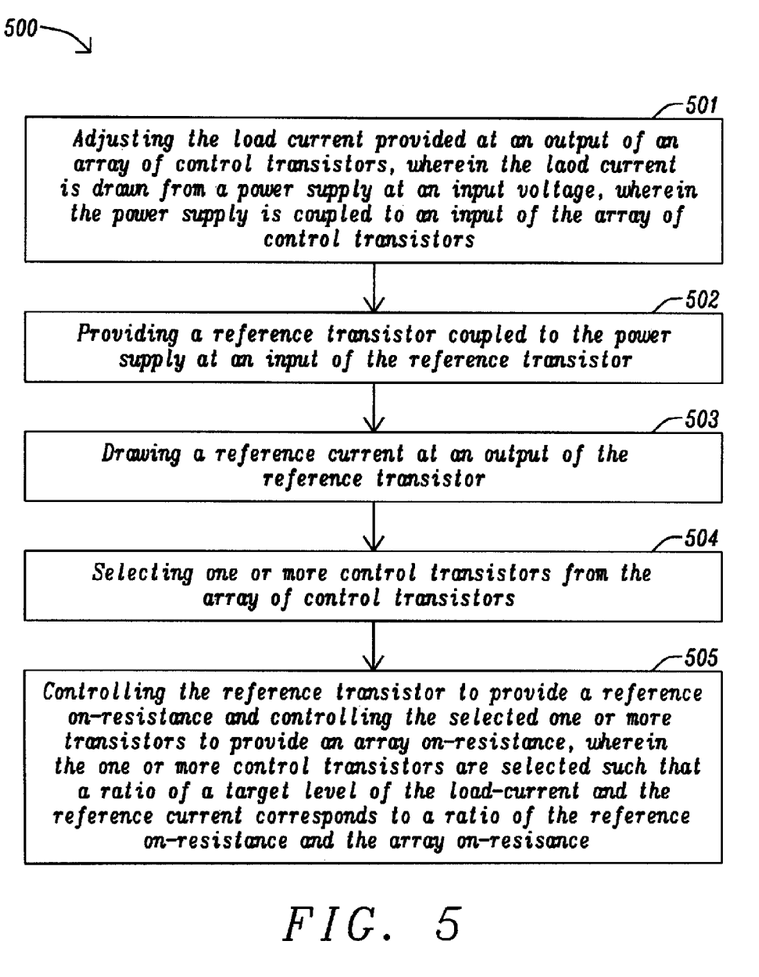
FIG. 5 shows a flow chart of an example method for controlling the input current of an electronic device.

FIG. 5 shows a flow chart of an example method 500 for controlling the level of an input current (also referred to as the load current) Iin 136 into an electronic device 103. The method 500 comprises adjusting 501 the load current 136 provided at an output of an array of control transistors 311-1, ..., 311-n. The load current 136 is typically drawn from a power supply at an input voltage 131. The power supply is typically coupled to an input of the array of control transistors 311-1, ..., 311-n. As outlined in the present document, the array of control transistors may comprise a plurality of parallel control transistors. The method 500 further comprises providing 502 a reference transistor 110 coupled to the power supply at an input of the reference transistor 110. In addition, the method 500 comprises drawing 503 a reference current 137 at an output of the reference transistor 110 (e.g. using a current source 112). The method 500 further comprises selecting 504 one or more control transistors from the array of control transistors 311-1, ..., 311-n. In addition, the method comprises controlling 505 the reference transistor 110 to provide a reference on-resistance and controlling the selected one or more control transistors to provide an array on-resistance. The one or more control transistors may be selected such that a ratio of a target level of the load current 136 and the reference current 137 corresponds to a ratio of the reference on-resistance and the array on-resistance. By doing this, it can be ensured that the relative accuracy of the actual level of the load current 136 with respect to the target level is at a high level (regardless the actual level of the load current).

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

What is claimed is:

1. A current control circuit for controlling a load current into an electronic device, the current control circuit comprising
    an array of control transistors configured to adjust the load current provided at an output of the array of control transistors; wherein the load current is drawn from a power supply at an input voltage; wherein the power supply is coupled to an input of the array of control transistors;
a reference transistor coupled to the power supply at an input of the reference transistor;
a reference current source configured to draw a reference current at an output of the reference transistor;
a controller configured to select one or more control transistors from the array of control transistors; and
transistor control units configured to control the reference transistor to provide a reference on-resistance and to control the selected one or more control transistors to provide an array on-resistance; wherein the controller is configured to select the one or more control transistors such that a ratio of a target level of the load current and the reference current corresponds to a ratio of the reference on-resistance and the array on-resistance.

2. The current control circuit of claim 1, the array of control transistors comprises a plurality of control transistors which are arranged in parallel.

3. The current control circuit of claim 1, wherein
the control transistors from the array of control transistors exhibit control transistor dimensions;
the reference transistor exhibits reference transistor dimensions;
the controller is configured to select the one or more control transistors such that the ratio of the target level of the load current and the reference current corresponds to a ratio of the reference transistor dimensions and effective dimensions of the selected one or more control transistors; and
the effective dimensions are dependent on the control transistor dimensions of the selected one or more control transistors.

4. The current control circuit of claim 3, wherein the control transistor dimensions and the reference transistor dimensions comprise length/widths ratios.

5. The current control circuit of claim 1, wherein
the control transistors of the array of control transistors have substantially equal on-resistances; and
the controller is configured to select more or less control transistors to decrease or increase, respectively, the array on-resistance.

6. The current control circuit of claim 1, wherein
the control transistors of the array of control transistors have different on-resistances;
the controller is configured to select different combinations of control transistors to adjust the array on-resistance.

7. The current control circuit of claim 6, wherein
the array of control transistors comprises an ordered sequence of r control transistors;
the on-resistances of adjacent control transistors of the ordered sequence of control transistors differ by a factor ½ starting from a maximum on-resistance; and
the controller is configured to select one or more control transistors to provide array on-resistances in the range of the maximum on-resistance times $[1, 1/(2^r-1)]$.

8. The current control circuit of claim 7, wherein the reference on-resistance corresponds to the maximum on-resistance.

9. The current control circuit of claim 8, wherein the electronic device is controlled in dependence of the comparison signal.

10. The current control circuit of claim 1, further comprising a comparator unit configured to compare a reference voltage at the output of the reference transistor with a load voltage at the output of the array of control transistors, to yield a comparison signal; wherein the comparison signal is indicative of a level of the load current relative to the reference current.

11. The current control circuit of claim 1, wherein the controller is configured to select different combinations of one or more control transistors to set different target levels of the load current.

12. The current control circuit of claim 1, wherein the transistor control units are configured to maintain open the one or more control transistors from the array of control transistors, which have not been selected.

13. The current control circuit of claim 1, wherein the controller is configured to select the one or more control transistors such that a relative deviation of the load current from the target level remains at or below a pre-determined threshold.

14. The current control circuit of claim 1, wherein the array of control transistors and/or the reference transistor comprise metal oxide semiconductor transistors.

15. A method for controlling a load current into an electronic device, the method comprising
adjusting the load current provided at an output of an array of control transistors; wherein the load current is drawn from a power supply at an input voltage; wherein the power supply is coupled to an input of the array of control transistors;
providing a reference transistor coupled to the power supply at an input of the reference transistor;
drawing a reference current at an output of the reference transistor;
selecting one or more control transistors from the array of control transistors; and
controlling the reference transistor to provide a reference on-resistance and controlling the selected one or more control transistors to provide an array on-resistance; wherein the one or more control transistors are selected such that a ratio of a target level of the load current and the reference current corresponds to a ratio of the reference on-resistance and the array on-resistance.

16. The method of claim 15, wherein said array of control transistors comprises a plurality of control transistors which are arranged in parallel.

17. The method of claim 15, wherein
the control transistors from the array of control transistors exhibit control transistor dimensions;
the reference transistor exhibits reference transistor dimensions;
the controller is configured to select the one or more control transistors such that the ratio of the target level of the load current and the reference current corresponds to a ratio of the reference transistor dimensions and effective dimensions of the selected one or more control transistors; and
the effective dimensions are dependent on the control transistor dimensions of the selected one or more control transistors.

18. The method of claim 17, wherein said control transistor dimensions and the reference transistor dimensions comprise length/widths ratios.

19. The method of claim 15, wherein said current control circuit wherein
said control transistors of the array of control transistors have substantially equal on-resistances; and
said controller selects more or less control transistors to decrease or increase, respectively, the array on-resistance.

20. The method of claim 15, wherein said current control circuit wherein
- said control transistors of the array of control transistors have different on-resistances;
- said controller selects different combinations of control transistors to adjust the array on-resistance.

21. The method of claim 20, wherein said current control circuit wherein
- the array of control transistors comprises an ordered sequence of r control transistors;
- the on-resistances of adjacent control transistors of the ordered sequence of control transistors differ by a factor ½ starting from a maximum on-resistance; and
- said controller selects one or more control transistors to provide array on-resistances in the range of the maximum on-resistance times $[1, 1/(2^r-1)]$.

22. The method of claim 21, wherein said current control circuit reference on-resistance corresponds to the maximum on-resistance.

23. The method of claim 15, wherein said current control circuit further comprising a comparator unit compares a reference voltage at the output of the reference transistor with a load voltage at the output of the array of control transistors, to yield a comparison signal; wherein the comparison signal is indicative of a level of the load current relative to the reference current.

24. The method of claim 15, wherein said controller selects different combinations of one or more control transistors to set different target levels of the load current.

25. The method of claim 15, wherein said transistor control units maintains open the one or more control transistors from said array of control transistors, which have not been selected.

* * * * *